2,962,485
PREPARATION OF ACETYLATED STYRENE POLYMERS

Henry A. Walter, Longmeadow, and Joseph A. Blanchette, East Longmeadow, Mass., assignors to Monsanto Chemical Company, St. Louis, Mo., a corporation of Delaware No Drawing. Filed Dec. 3, 1957, Ser. No. 700,295

4 Claims. (Cl. 260—93.5)

This invention relates to polymeric styrene derivatives containing reactive groups. More particularly, it relates to a novel method for the preparation of ring-acylated styrene polymers.

Styrene polymers are finding increased application due to the broad range of properties available in the several homologues. More recently, the ring-substitution of such polymers with reactive groups has greatly expanded the range of properties available. Of these, the ring-acetylated styrene polymers are a most important group in that they serve as chemical precursors for other valuable ring-substituted styrene polymers in addition to having significant utility in themselves.

Therefore, it is an object of this invention to provide a novel method for acetylating styrene polymers.

Another object is to provide ring-acetylated styrene polymers.

Another object is to provide adhesives and film-forming materials.

Another object is to provide chemical intermediates for the production of other useful ring-substituted styrene polymers.

These and other objects are attained by reacting ketene ($CH_2=C=O$) with a styrene polymer in the presence of a Friedel-Crafts catalyst.

The following examples are given in illustration of the invention and are not intended as limitations thereof.

Example I

At least 0.2 mol of aluminum chloride and about 100 ml. of carbon disulfide are charged to a reflux vessel. A moderate stream of gaseous ketene is passed into the liquid phase and stirring is begun. With the reaction system at substantially room temperature, circa 25° C., about 0.6 mol (upon a monomeric basis) of polystyrene dissolved in about 250 ml. of carbon disulfide is added dropwise over a period of about 45 minutes. The ketene addition is continued for about 1½ hours after the polystyrene has been added. The reaction mixture is then poured over about 500 grams of cracked ice containing about 20 ml. of concentrated hydrochloric acid. To recover the product, the carbon disulfide is removed by steam distillation and the remaining mixture is cooled to solidify the resinous product. After decanting the aqueous phase, the solids are washed with water and re-dissolved in about 200 ml. of acetone. This solution is filtered and added dropwise to a large excess of methanol. The white precipitate is recovered by filtration and dried. Infrared spectrophotometric analysis shows the product to be a para acetylated polystyrene. Chemical analysis, wherein the carbonyl portion of the acetyl groups are converted to oxime groups, reveals that substantially all of the aromatic rings of the polystyrene are acetylated.

Example II

Example I is repeated using only about 0.1 mol of aluminum chloride. Analysis shows the product to be a para acetylated polystyrene wherein approximately 50% of the aromatic rings have been acetylated.

Similar results are obtained using ferric chloride, stannic chloride, boron fluoride and zinc chloride as catalysts.

For the purpose of this invention, the term "styrene polymer" refers to vinylidene aromatic homopolymers and certain solvent-soluble copolymers thereof wherein the vinylidene aromatic units are present in at least 50 mol percent. The vinylidene aromatic monomers from which these "styrene polymers" are derived are styrene, divinyl benzene, alpha methyl styrene or the nuclear substituted derivatives thereof, said nuclear substituents being alkyl groups containing from 1 to 4 carbon atoms. It is preferred to use homopolymers of the above which have Staudinger molecular weights of from about 5000 to 60,000. However, except for divinyl benzene and its derivatives, these vinylidene aromatic monomers may be copolymerized with one another to obtain solvent-soluble copolymers or they may be copolymerized with other copolymerizable vinylidene monomers such as ethylenically unsaturated hydrocarbons, e.g., ethylene, propylene or isobutylene; alpha-unsaturated nitriles, e.g., acrylonitrile, etc.; vinyl ester, e.g., vinyl acetate, etc.; and alkyl acrylates, e.g., methyl acrylate or methacrylate, etc.

Suitable homopolymers include, for example, polymers of styrene, divinyl benzene, alpha-methyl styrene, 2,4-dimethyl styrene, p-butyl styrene, p-methyl-alpha-methyl styrene, 1,4-divinyl-6-ethyl benzene, etc. However, the preferred homopolymer is polystyrene. Similarly, the suitable copolymers include copolymers of styrene-alpha-methyl styrene, styrene-acrylonitrile, ethylene-styrene, alpha-methyl styrene-methyl acrylate, etc.

The solvent in which the acetylation reaction is performed must be less reactive than the styrene homopolymer used. It is not necessary that the ketene be completely soluble therein; it is sufficient that at least a minor proportion be so soluble. In fact, if it is desired that the rate of reaction be controlled, the particular solvent used may be selected with this end in view. Carbon disulfide is the preferred solvent but any styrene solvent possessing the attributes mentioned above may be used. Other highly suitable solvents include nitrobenzene and chlorinated aliphatic hydrocarbons such as tetrachloromethane, tetrachloroethane, etc.

Ketene ($CH_2=C=O$) is a rather unstable gaseous compound, having a tendency to dimerize within a few hours at room temperature. It may be prepared by the pyrolysis of either acetic acid, ethyl acetate or acetone at a temperature of from 680° to 720° C. If acetic acid or ethyl acetate are used as the ketene source, the pyrolysis by-products, water and ethanol respectively, must be condensed from the gaseous stream prior to its use in the acetylation reaction. However, ketene derived from acetone need not be purified since its co-product, methane, is totally inert to the acetylation reaction.

The acetylation reaction is preferably run at substantially room temperature. However, temperatures from —20° C. to the reflux temperature of the solvent may be employed if desired.

As used in this specification and in the appended claims, the term "degree of acetylation" refers to the average number of acetyl groups entered into each 100 aromatic rings of the styrene polymer. Thus, a degree of acetylation of 50 means that an average of 50% of the aromatic rings of a styrene polymer contain 1 acetyl group.

The degree of acetylation may be controlled through adjustment of the molar proportions of the reactants. However, it has been found that 1 mol equivalent of Friedel-Crafts catalyst is required for each mol of ketene reacted. Therefore, since the reaction rate and the reaction equilibria are favored by the use of excess ketene, it is preferred to control the degree of acetylation through adjustment of the molar proportion of the Friedel-Crafts catalyst to the styrene polymer. Thus a degree of acetylation of 60 may be obtained by reacting 1 mol of a styrene homopolymer with at least 0.6 mol of ketene in the presence of 0.2 mol of aluminum chloride ($AlCl_3$) or 0.15 mol of stannic chloride ($SnCl_4$). This invention contemplates ring-acetylated styrene polymers having a degree of acetylation of 10 to 100. Styrene polymers having a degree of acetylation of 50 to 100 are especially preferred.

The acetylation is effected in a suitable reaction vessel equipped with an agitator and reflux means. The required quantity of Friedel-Crafts catalyst and solvent are charged to the reaction vessel. Then the ketene and the styrene polymer are introduced to the vessel. In many instances it is immaterial which reactant is added first and both may be added simultaneously. However, to attain complete reaction under the stoichiometrically adjusted concentrations of Friedel-Crafts catalyst and styrene polymer, as discussed in the previous paragraph the reaction equilibrium must be shifted to favor formation of the acetylated styrene polymer. This is achieved by continuously passing gaseous ketene into the solvent in the reaction vessel and slowly adding a solution of the styrene polymer thereto, at a rate such that the molar concentration of ketene in solution is always in excess of the molar concentration of the unreacted styrene polymer also in said solution. Ketene addition is continued throughout the polymer addition and for an extended period thereafter to insure completion of the reaction. The entire process is effected under constant agitation. When the reaction is completed or the desired degree of acetylation has been attained, the reaction mixture is poured over a quantity of cracked ice containing concentrated hydrochloric acid.

Recovery of the acetylated styrene polymer is accomplished according to conventional techniques. One method which is highly satisfactory consists of first removing the solvent by steam distillation, cooling the residue to solidify the resin and decanting the aqueous phase. The solids are re-dissolved in a second solvent. Acetone, methyl-ethyl-ketone or any of the previously mentioned solvents may be used. This solution is filtered to remove impurities and the purified acetylated styrene polymer is recovered by adding the solution slowly to an excess of a non-solvent such as water, methanol, etc.

The acetylated styrene polymers of this invention may be modified by the incorporation of conventional additives such as dyes, pigments, stabilizers, plasticizers, fillers, extenders, etc. The homopolymers may also be used in co-mixture with other polymeric materials, e.g., with acrylonitrile polymers, styrenebutadiene copolymers, etc.

These ring-acetylated styrene polymers possess many valuable properties and have several important uses. Among the more significant properties; they are more stable to light and have considerably lower softening temperatures than do their parent styrene polymers, they are highly adhesive and they are soluble in acetone and methyl-ethyl-ketone. Therefore, the products of this invention may be used as plasticizers, water-proof adhesives for, e.g., plywood, etc., and most important, may be cast into clear, transparent, flexible films for use in packaging applications, etc.

*Example III*

About 20 grams of the p-acetylated polystyrene prepared in Example I are dissolved in about 100 ml. of acetone. This sirupy solution is cast onto a glass plate in a uniform film of about 0.002 inch thickness. After drying in an oven at 60° C. for 20 minutes, a transparent flexible film is peeled from the glass.

The ring-acetylated styrene polymers are also extremely valuable as chemical intermediates for the preparation of other chemically modified styrene polymers. Their reactive carbonyl groups undergo all conventional carbonyl reactions, e.g., oxidation, reduction, oxime formation, etc.

It is obvious that many variations may be made in the products and processes of this invention without departing from the spirit and scope thereof.

What is claimed is:

1. A process for preparing ring-acetylated styrene polymers having a degree of acetylation of from 10 to 100 which comprises reacting a styrene polymer dissolved in an inert organic solvent with at least the theoretically required proportion of ketene at a temperature of from −20° C. to the reflux temperature of the reaction mixture in the presence of from 0.1 to 1.0 mol equivalents of a Friedel-Crafts catalyst per mol of phenyl rings contained in said styrene polymer; said styrene polymer being selected from the group consisting of homopolymers of styrene, divinyl benzene, alphamethylstyrene and the mono- and di-alkyl nuclearly substituted derivatives thereof wherein said alkyl groups contain from 1–4 carbon atoms and copolymers thereof with up to 50 mol percent of a vinyl monomer copolymerizable therewith.

2. A process as in claim 1 wherein the styrene polymer is polystyrene.

3. A process as in claim 1 wherein the reaction is effected in the presence of from 0.5–1.0 mol equivalents of a Friedel-Crafts catalyst per mol of phenyl rings in said styrene polymer.

4. A process as in claim 3 wherein the styrene polymer is polystyrene.

References Cited in the file of this patent

UNITED STATES PATENTS

| | | |
|---|---|---|
| 1,870,104 | Dreyfuss | Aug. 2, 1932 |
| 2,642,398 | Butler | June 16, 1953 |
| 2,716,097 | Unruh et al. | Aug. 23, 1955 |

OTHER REFERENCES

Dashkevich: J. Gen. Chem., 16 (USSR), pp. 739–41 (1946); CA 1217(d), vol. 41 (1947).